United States Patent
Fedorovich

[11] Patent Number: 6,017,037
[45] Date of Patent: Jan. 25, 2000

[54] SEAL DEVICE

[75] Inventor: George Fedorovich, Nacogdoches, Tex.

[73] Assignee: J.M. Clipper Corporation, Nacogdoches, Tex.

[21] Appl. No.: 08/951,313

[22] Filed: Oct. 16, 1997

Related U.S. Application Data

[63] Continuation-in-part of application No. 08/725,958, Oct. 7, 1996, Pat. No. 5,735,530, which is a continuation of application No. 08/251,268, May 31, 1994, abandoned, which is a continuation-in-part of application No. 08/064,375, May 21, 1993, Pat. No. 5,316,317.

[51] Int. Cl.[7] .................................................. F16J 15/447
[52] U.S. Cl. ............................ 277/419; 277/423; 277/430
[58] Field of Search .................................... 277/347, 411, 277/412, 418, 419, 420, 421, 423, 429, 430

[56] References Cited

U.S. PATENT DOCUMENTS

| | | |
|---|---|---|
| 2,995,390 | 8/1961 | Gardner . |
| 3,015,504 | 1/1962 | Fulton et al. . |
| 3,277,797 | 10/1966 | Tyree, Jr. et al. .......................... 92/194 |
| 4,022,479 | 5/1977 | Orlowski . |
| 4,114,902 | 9/1978 | Orlowski . |
| 4,175,752 | 11/1979 | Orlowski . |
| 4,304,409 | 12/1981 | Orlowski . |
| 4,379,600 | 4/1983 | Muller .................................. 308/187.1 |
| 4,576,383 | 3/1986 | Ballard . |
| 4,596,394 | 6/1986 | Schmitt . |
| 4,667,967 | 5/1987 | Deuring . |
| 4,706,968 | 11/1987 | Orlowski . |
| 4,743,034 | 5/1988 | Kakabaker et al. . |
| 4,848,937 | 7/1989 | Hartman et al. ........................ 384/480 |
| 4,852,890 | 8/1989 | Borowski . |
| 4,890,941 | 1/1990 | Calafell, II et al. .................... 384/480 |
| 4,989,883 | 2/1991 | Orlowski . |
| 5,024,451 | 6/1991 | Borowski . |
| 5,028,054 | 7/1991 | Peach . |
| 5,040,804 | 8/1991 | Back . |
| 5,069,461 | 12/1991 | Orlowski . |
| 5,158,304 | 10/1992 | Orlowski . |
| 5,174,583 | 12/1992 | Orlwoski . |
| 5,207,291 | 5/1993 | Mezzedimi et al. ................... 184/6.16 |
| 5,221,095 | 6/1993 | Orlowski . |
| 5,228,700 | 7/1993 | Biesold et al. . |
| 5,238,166 | 8/1993 | Schwarstein et al. . |
| 5,259,628 | 11/1993 | Nisley . |
| 5,269,536 | 12/1993 | Matsushima et al. . |
| 5,290,047 | 3/1994 | Duffee et al. . |
| 5,299,349 | 4/1994 | Seibig ...................................... 29/447 |
| 5,305,509 | 4/1994 | Yuhara et al. .............................. 29/39 |
| 5,347,189 | 9/1994 | Chuta et al. .............................. 310/90 |
| 5,378,000 | 1/1995 | Orlowski . |
| 5,403,019 | 4/1995 | Marshall . |
| 5,456,476 | 10/1995 | Premiski et al. . |
| 5,478,090 | 12/1995 | Simmons et al. . |
| 5,498,006 | 3/1996 | Orlowski . |
| 5,522,601 | 6/1996 | Murphy . |
| 5,636,848 | 6/1997 | Hager et al. . |

Primary Examiner—Anthony Knight
Assistant Examiner—John L. Beres
Attorney, Agent, or Firm—Dickstein Shapiro Morin & Oshinsky LLP

[57] ABSTRACT

A labyrinth seal device formed of a rotor and a stator connected together by an annular protrusion located within a recess. The rotor has a slinger located on the housing side of the rotor/stator interface. The stator has a plurality of alternating annular ridges and grooves which, together with an axial groove, direct fluid back into the housing to which the stator is attached. One of the ridges is positioned within the slinger recess, such that fluid traveling along a shaft to which the rotor is attached is slung off the slinger into the annular groove.

24 Claims, 8 Drawing Sheets

SEAL DEVICE

This is a continuation-in-part of U.S. patent application Ser. No. 08/725,958, filed Oct. 7, 1996, now U.S. Pat. No. 5,735,530, which is a continuation of Ser. No. 08/251,268, filed May 31, 1994, now abandoned, which is a continuation-in-part of Ser. No. 08/064,375, filed May 21, 1993, now U.S. Pat. No. 5,316,317.

BACKGROUND OF THE INVENTION

The present invention relates to a device for providing a seal between a shaft and a housing. In particular, the present invention relates to a dynamic seal device for preventing oil from leaking out of a housing and/or for preventing contaminants from traveling into the housing. The present invention also relates to a method of assembling a sealed system.

Prior art devices for sealing a rotating shaft are disclosed in U.S. Pat. No. 4,022,479 (Orlowski) and U.S. Pat. No. 5,024,451 (Borowski). Seal devices of this type may be used to prevent oil from escaping out of a bearing housing and/or to prevent contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing means, not shown in the prior art patent. The ring members themselves have no means for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

The ring members of the Borowski device are held together by a bead and a groove provided on the ring members themselves. The bead fits within the groove with an interference fit. This arrangement is an improvement over the Orlowski system in the sense that no separate securing means is needed. But the Borowski device is still unsatisfactory because the bead must be resiliently deformed to be positioned within the groove, and the groove must be correspondingly enlarged to receive the deformed bead. The deformation of the bead during assembly makes it difficult to achieve the desired close positioning between the two ring members, as explained in more detail below.

Some prior art references refer to the use of a rotor and a stator, the latter including a plurality of alternating annular grooves and ridges and an axial groove. The grooves and ridges catch oil thrown by the rotating shaft. The oil then drains by gravity to the axial groove which allows the oil to travel back into the housing.

These types of sealed systems may have deficiencies in applications where the shaft rotates at low revolutions per minute or the oil has a high viscosity. In either of these applications, the oil may continue to travel along the shaft beyond the alternating grooves and ridges.

SUMMARY OF THE INVENTION

The disadvantages of the prior art are alleviated to a great extent by the present invention which provides a seal device including a rotor and a stator, each having a connecting portion, with the connecting portion of the rotor being located radially inside of the connecting portion of the stator, and with the connecting portions being connected to each other by expansion of the stator relative to the rotor.

In one aspect of the present invention, the seal device includes a slinger to assist in guiding oil back into the housing.

In another aspect of the invention, the connecting portion of the rotor is in the form of an annular recess, and the other connecting portion is an annular protrusion located within the recess.

An object of the invention is to provide an interlocked two piece labyrinth seal. Forming the seal of only two pieces is advantageous. A two piece seal may have fewer leakage paths than a three piece seal. Moreover, a two piece seal may be more economical to manufacture and more reliable.

Another object of the present invention is to provide a seal device that can be accurately assembled, with very little play.

Another object of the invention is to provide a high performance seal device that can be produced economically.

Another object of the present invention is to provide an improved method of assembling a seal device.

Other objects and advantages of the present invention will become apparent from the following description and drawings which illustrate preferred embodiments of the present invention.

DETAILED DESCRIPTION OF PREFERRED EMBODIMENTS

Figure 1:
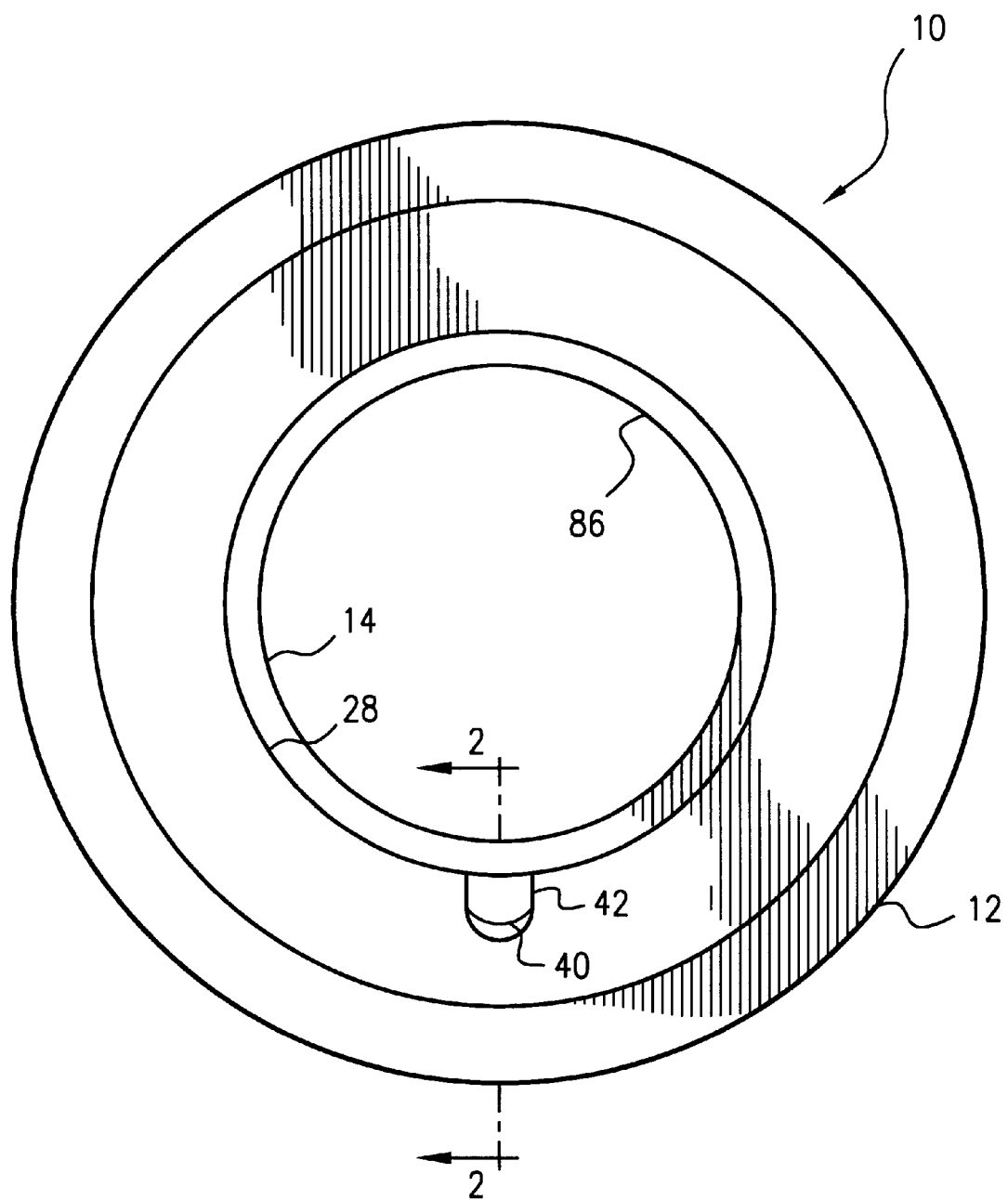
FIG. 1 is a front elevational view of a seal device constructed in accordance with a first embodiment of the present invention.
Figure 2:
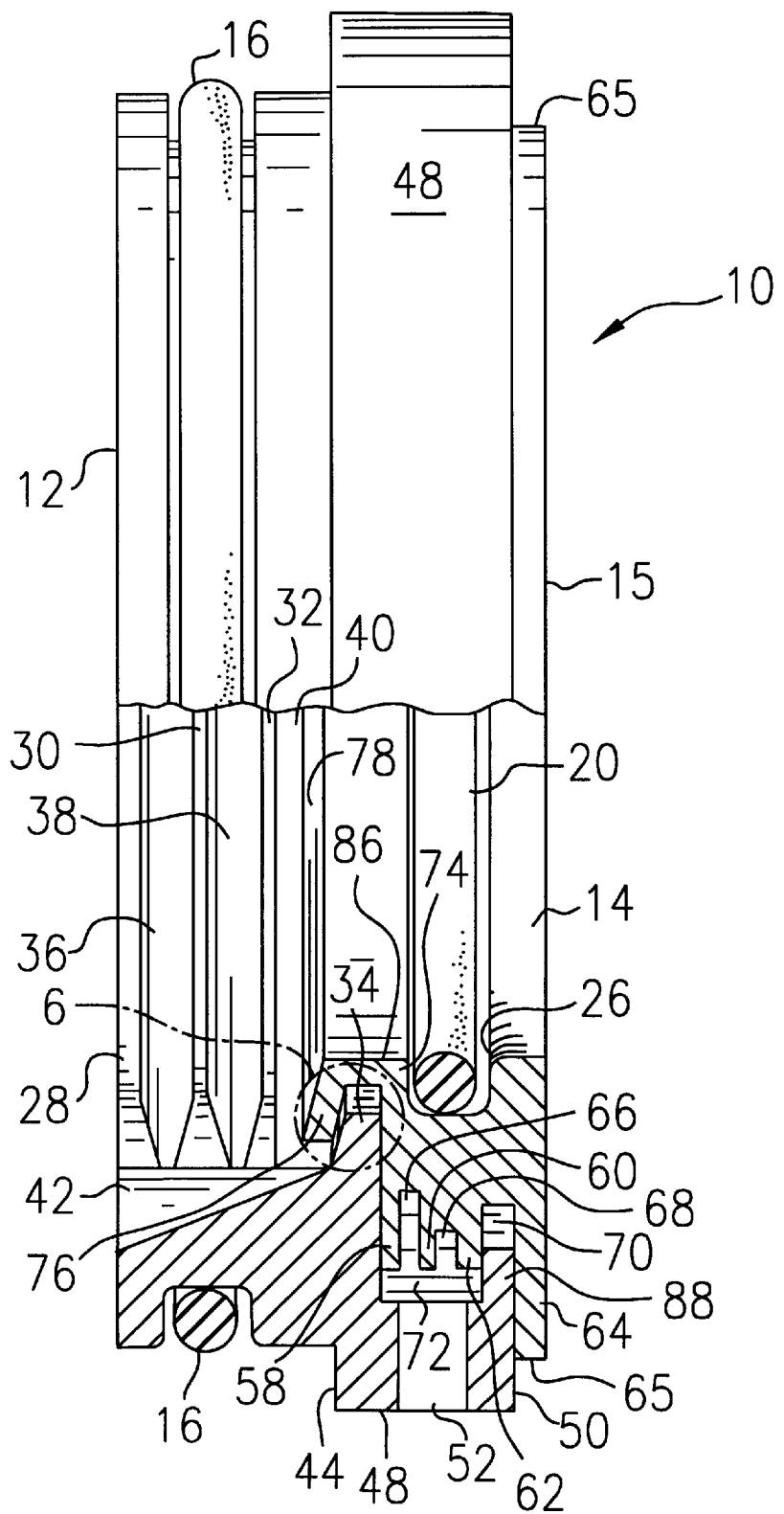
FIG. 2 is a partial cross sectional side view of the seal device of FIG. 1, taken along line 2—2 of FIG. 1.

Referring now to the drawings, wherein like reference numerals indicate like elements, there is shown in FIGS. 1–6 a ring-shaped seal device 10 constructed in accordance with a first embodiment of the present invention. The seal device 10 includes a stator 12 and a rotor 14 (FIG. 2). An O-ring 16 is provided between the stator 12 and a housing 18 (FIG. 3), and an O-ring 20 is provided between the rotor 14 and a shaft 22. The ring-shaped stator and rotor 12, 14 may be made of a suitable metal. In a preferred embodiment of the invention, the stator and rotor 12, 14 may be made of polytetrafluoroethylene (PTFE) or PTFE alloy. The O-rings 16, 20 may be made of a suitable elastomeric material.

The stator O-ring 16 provides a tight seal between the stator 12 and the housing 18. Moreover, the radial compression of the O-ring 16 between the stator 12 and the housing 18 is sufficient to prevent the stator 12 from rotating with respect to the housing 18. The rotor O-ring 20 provides a tight seal between the rotor 14 and the shaft 22, and the compression of the O-ring 20 between the rotor 14 and the shaft 22 is sufficient to make the rotor 14 rotate in unison with the shaft 22.

In operation, the stator O-ring 16 prevents oil from escaping out of the housing 18 around the outside of the stator 12, and the rotor O-ring 20 prevents contaminants from traveling into the housing 18 along the surface of the shaft 22. Oil and contaminants are dynamically prevented from traveling in a radial direction through the interface between the stator and rotor 12, 14 as explained in more detail below.

Since the stator 12 does not rotate with respect to the housing 18, the stator O-ring 16 is not subjected to friction. Therefore, the stator O-ring 16 has a long useful life. Similarly, since the rotor 14 does not rotate with respect to the shaft 22, the rotor O-ring 20 is not subjected to friction and has a long useful life.

Figure 3:
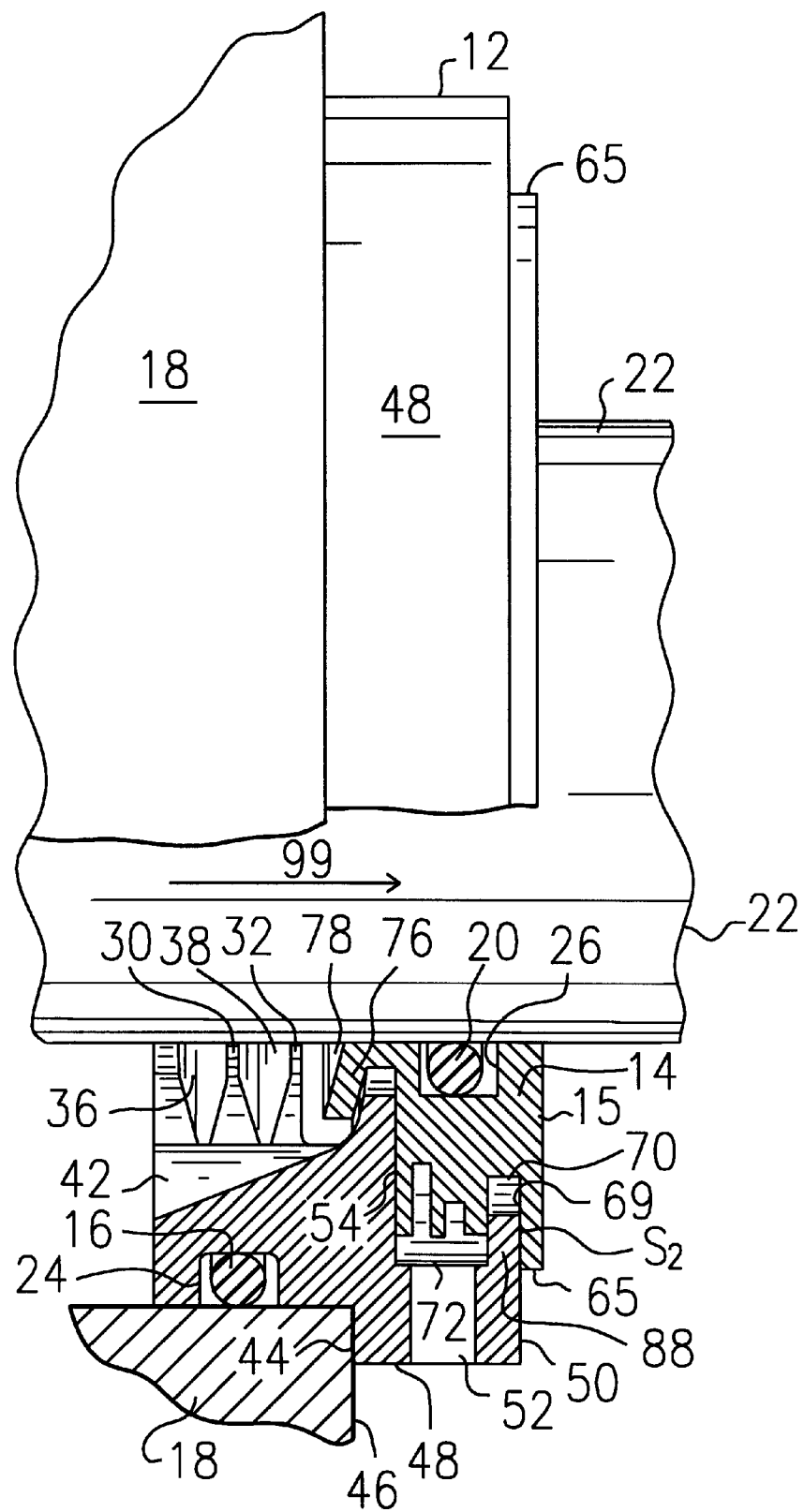
FIG. 3 is a partial cross sectional side view like FIG. 2, but showing the seal device employed within a sealed system.

The stator O-ring 16 is located within an annular recess 24. As illustrated in FIG. 3, the recess 24 has a rectangular cross section. The rotor O-ring 20 is also located within a rectangular cross sectioned annular recess 26. The purpose of the recesses 24, 26 is to ensure that the O-rings 16, 20 are located in their proper positions when the seal device 10 is installed within the housing 18 to provide a seal around the shaft 22.

Figure 4:
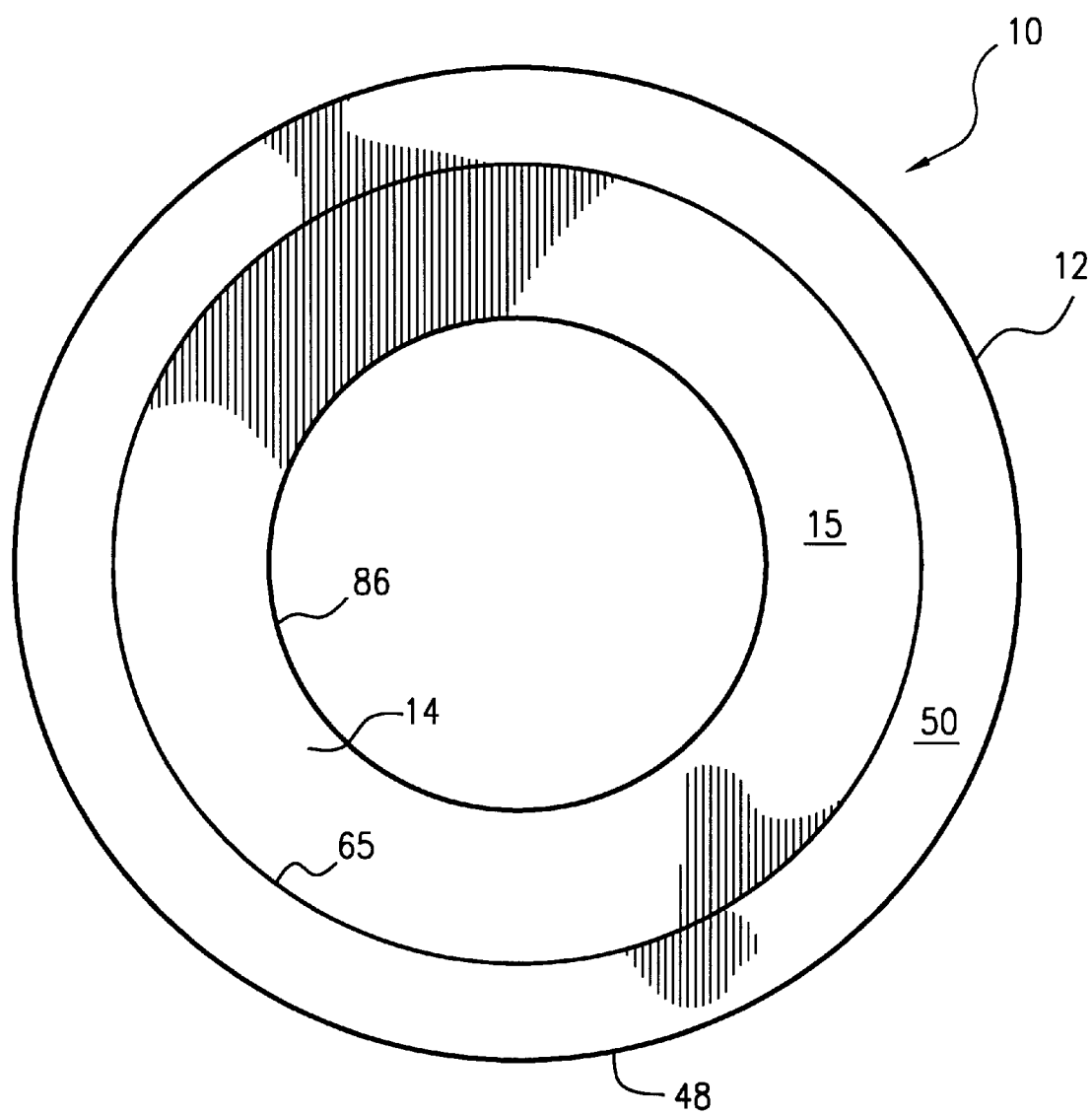
FIG. 4 is a rear elevational view of the stator member for the seal device of FIG. 1.
Figure 5:
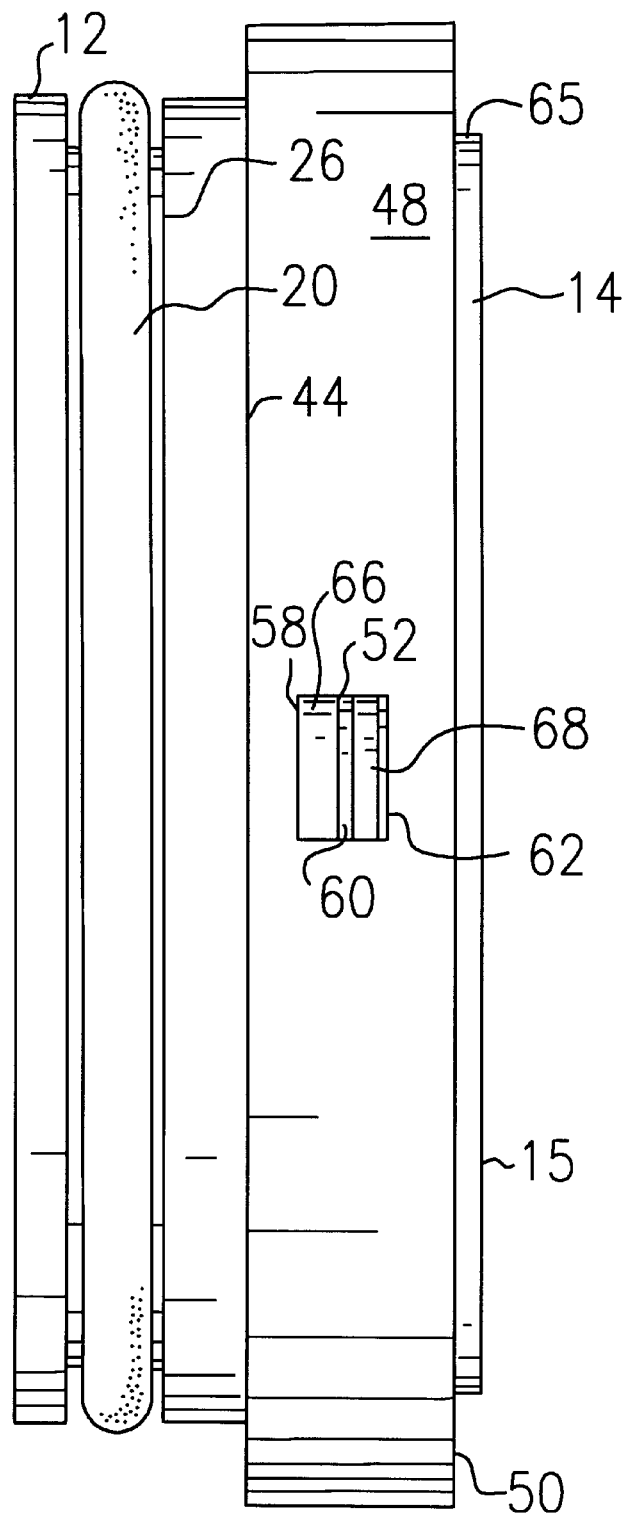
FIG. 5 is a bottom view of the seal device of FIG. 1.

For clarity of illustration, the O-rings 16, 20 are not shown in FIGS. 1 and 4.

Referring to FIG. 2, the stator 12 has a series of alternating annular ridges 28, 30, 32, 34 and annular grooves 36, 38, 40. The grooves 36, 38, 40 are located between the ridges 28, 30, 32, 34. An axial groove 42 is provided at the bottom of the seal device 10 to connect the grooves 36, 38, 40 to the interior of the housing 18.

Figure 6:
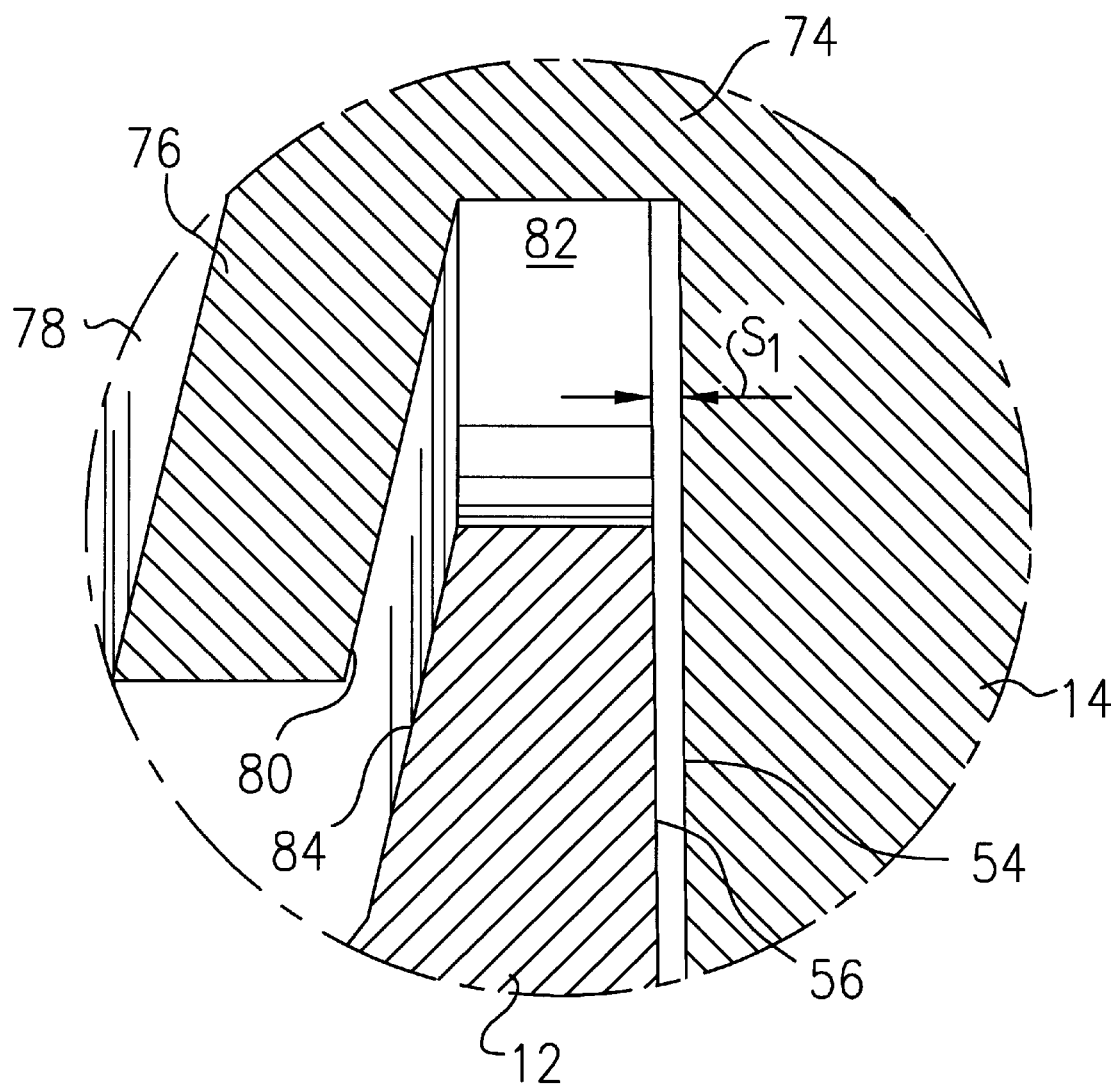
FIG. 6 is an enlarged view of the interface shown in circle 6 of FIG. 2.

The rotor 14 has an outwardly facing end face 15 (FIG. 3) and an inwardly facing end face 54 (FIG. 6). Extending axially inward from the end face 54 is a rotor flange 74 having a radially inward surface 86 (FIG. 2). The flange 74 has a rotor slinger 76. The rotor slinger 76 has an inwardly facing wall 78 (FIG. 6) and an outwardly facing wall 80. Advantageously, the slinger 76 is angled in a direction opposite from direction 99 such that wall 78 is at an angle of less than 90 degrees from the plane in which surface 86 is. However, the slinger 76 may be angled such that the wall 78 is at or greater than 90 degrees from the plane in which surface 86 is.

Between the outwardly facing wall 80 and the end face 54 is a flange recess 82. The fourth ridge 34, which has an inwardly facing wall 84, is located in the recess 82. The slinger 76 is positioned on the housing side of the seal device 10 and extends radially outwardly into the third groove 40 such that the outwardly facing wall 80 faces the inwardly facing wall 84.

In operation, lubricating oil traveling outwardly along the surface of the shaft 22 in a direction 99 (FIG. 3) past the first ridge 28 is rotated by the rotating shaft 22 and thrown by centrifugal force into the first annular groove 36. The oil then falls by gravity into the axial groove 42 and is thereby directed back into the housing 18. Oil that makes its way past the first groove 36 and past the second ridge 30 is thrown by centrifugal force into the second groove 38 and then drained by gravity into the axial groove 42 to be directed back into the housing 18. Thus, the stator 12 and the rotating shaft 22 work together dynamically to prevent oil from escaping out of the housing 18.

In typical applications little oil escapes outwardly past the second groove 38 and the third ridge 32. However, in applications where the shaft 22 is turning at a low rate of revolutions, or where the viscosity of the oil is high, or when the oil is splashing against the seal due to bearing or gear movement, some oil may travel along the shaft 22 in the direction 99 past the third ridge 32. This may be caused by the surface tension of the oil being high enough to overcome the rotational forces exerted on it by the shaft 22.

In such applications, the oil is thrown by centrifugal force against the wall 78 of the slinger 76. The rotation of the slinger 76 throws the oil from the wall 78 into the third groove 40, and then the oil falls by gravity into the axial groove 42 to be directed back into the housing 18. Any oil traveling along the shaft 22 past the wall 78 is prevented from continuing in its path by the O-ring 20. Any such oil will be redirected back along the shaft 22 and/or surface 86, in a direction opposite from the direction 99, to be slung by the slinger 76 into the third groove 40.

The stator 12 has an inwardly directed shoulder face 44 for contacting an outer wall 46 of the housing 18. The shoulder face 44 is used during assembly to properly locate the stator 12 with respect to the housing 18. That is, the stator 12 may be simply pushed into the housing 18 until the shoulder face 44 abuts against the housing wall 46. The shoulder face 44 prevents the stator 12 from moving too far into the housing 18. The shoulder face 44 may be omitted in an alternative embodiment of the invention. Space limitations may prevent the use of the shoulder face 44.

The stator 12 also has a ring-shaped cover 48. The cover 48 extends axially outwardly from the shoulder face 44. The cover 48 at least partially surrounds the outside diameter of the rotor 14. The cover 48 has an outwardly directed end face 50. The cover 48 has a radial slot-shaped opening 52. The opening 52 is located at the bottom of the seal device 10 (like the axial drain groove 42 of the stator 12). The cover opening 52 is used to direct contaminants out of the seal device 10, as described in more detail below.

Referring to FIG. 6, an interface between the stator 12 and the rotor 14 is located between the inwardly directed end face 54 and an outwardly directed face 56 of the stator 12. The two faces 54, 56 are spaced apart from each other such that there is essentially no friction between the two faces 54, 56. But the axial distance $S_1$ between the two faces 54, 56 is very small. The distance $S_1$ should be very small to prevent particles from traveling in a radially inward direction (i.e., toward the shaft 22) between the two faces 54, 56. If the stator and rotor 12, 14 are made of PTFE alloy, or another suitable material, then the faces 54, 56 may lightly touch each other.

Even though the axial distance $S_1$ may be very small, in certain applications, oil may be able to travel up the shaft 22 along direction 99 up to the rotor-stator interface. To prevent oil from being flung into the rotor-stator interface, the rotor flange 74 and slinger 76 are positioned to close off the interface opening closest to the shaft 22. Specifically, the flange 74 is positioned straddling the interface and the slinger 76 is positioned on the stator side, or housing side, of the rotor-stator interface.

As illustrated in FIG. 2, alternating annular ridges 58, 60, 62, 64 and recesses 66, 68, 70 are located between the opposite end faces 15, 54 of the rotor 14. The outermost ridge 64 has an inwardly facing wall 69 which faces the end face 50. The axial distance between the end face 50 and the wall 69 is designated by reference character $S_2$. In the illustrated embodiment of the invention, the innermost recess 66 is deeper than the middle recess 68 and the outer recess 70. In an alternative embodiment of the invention, the recess 68 and/or the recess 70 may be deeper than the innermost recess 66. The purpose of the alternating ridges 58, 60, 62, 64 and recesses 66, 68, 70 is to prevent contaminants from traveling toward the interior of the housing 18 and reaching the inwardly directed end face 54 of the rotor 14, as described in more detail below.

In operation, contaminants that find their way into the space $S_2$ between the cover wall 50 and the wall 69 come into contact with the surfaces of the rotor recesses 66, 68, 70. The rotation of the rotor 14 causes the contaminants to be thrown by centrifugal force onto the inner wall 72 of the cover 48. The contaminants then move by gravity though the slot-shaped opening 52.

The stator 12 and the rotor 14 are connected together by connecting portions shown in FIG. 2. As illustrated, the cover 48 has a radial protrusion 88 extending radially inwardly. The protrusion 88 fits within recess 68 of the rotor 14 such that the protrusion 88 is sandwiched between the ridges 62, 64. The protrusion 88 is located close to the wall 69 of the ridge 64. The protrusion 88 has a rectangular cross section. The protrusion 88 may have a slanted surface (not shown) for guiding the rotor 14 into the cover 48.

It is advantageous to minimize the sum of the axial distances $S_1$ and $S_2$ (FIGS. 3 and 6). This sum will be referred to herein as the total axial play $S_t$ of the seal device 10 ($S_t=S_1+S_2$). In particular, the total axial play $S_t$ should be as small as possible without being equal to zero. When the axial play $S_t$ is very small, there is very little room for contaminants to move in a radial direction through the interface between the rotor 14 and the stator 12 (i.e., between the end faces 54, 56. The rotor 14 should fit within the stator 12 with just enough play $S_t$ to ensure that there is substantially no friction between the relatively rotating stator 12 and rotor 14.

To assemble the seal device 10, the stator 12 (including the cover 48), is expanded to increase the diameter of the innermost end region 89 of the protrusion 88 relative to the outer diameter of the annular ridges 58, 60, 62. In a preferred embodiment of the invention, the cover 48 is expanded until the diameter of the innermost end region 89 is substantially equal to or greater than the outer diameter of the annular ridges 58, 60, 62. The rotor 14 can then be easily moved axially into position within the stator 12, with the protrusion 88 located directly radially inside of the recess 70. The stator 12 is then allowed to return substantially to its original size such that the protrusion 88 is located within the recess 70 as illustrated in FIGS. 2, 3. In a preferred embodiment of the invention, the diameter of the innermost end region 89 of the protrusion 88 is expanded by heating the cover 48.

The above-described expansion technique is advantageous because it makes it possible to minimize the total axial play $S_t$. If the protrusion 88 were forced into the recess 70, by driving the rotor 14 into the cover 48 without first expanding the cover 48, the innermost end region 89 of the protrusion 88 would be temporarily distorted outwardly. That is, the protrusion's side face would be bent outwardly, increasing the axial distance between the innermost end region 89 and the inwardly facing wall 69 of the rotor 14. To provide room for this distortion during assembly, the total axial play $S_t$ would have to be increased, which would disadvantageously provide more room between the stator and rotor 12, 14 for contaminants to travel into the housing 18. The present invention overcomes this problem by reducing or eliminating axial resilient distortion of the protrusion E during assembly.

Figure 7:
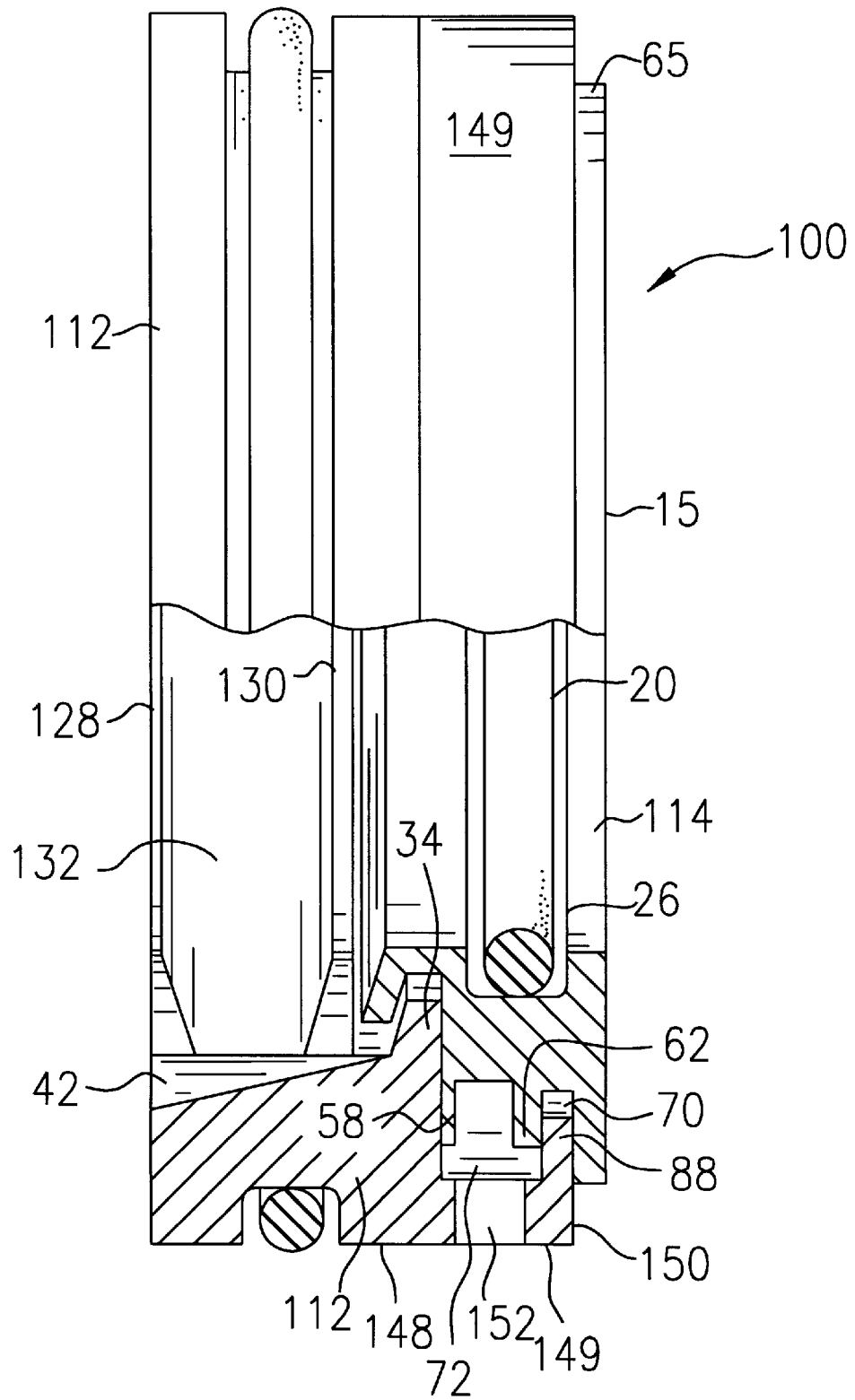
FIG. 7 is a partial cross sectional side view of a seal device constructed in accordance with another embodiment of the present invention.

Another preferred embodiment of the present invention, as illustrated in FIG. 7, shows a seal device 100 which includes a rotor 114 and a stator 112. The stator 112 may be assembled to the rotor 114 by the method described above with regard to the embodiment illustrated in FIGS. 1–6. Rotor 114 is similar to rotor 14, with the exception of the omission of annular ridge 60. The stator 112 has two significant changes differentiating it from the stator 12. The first is that it contains alternating annular ridges 128, 130, 34 and annular grooves 132, 40. The groove 132 is wider than the groove 40. The wide groove 132 is useful for applications which would cause a large sludge buildup in the oil. In such applications, less wide annular grooves may back up with a sludge buildup. Such a back up is prevented with the wide groove 132.

Further, the stator 112 lacks a shoulder for abutting with the housing 18. Instead, the stator 112 includes a cover 148 having an inclined portion 149. The inclined portion 149 is inclined inwardly toward the shaft 22 and away from the housing 18.

An opening 152 is positioned on inclined portion 149 and is used to direct contaminants out of the seal device 100 similarly to opening 52. Through this arrangement, the seal device 100 may be placed deeper within the housing. The seal device 100 is appropriate for applications where there is sufficient room within the housing 18 for the seal device 100 but limited room outside the housing 18.

Figure 8:
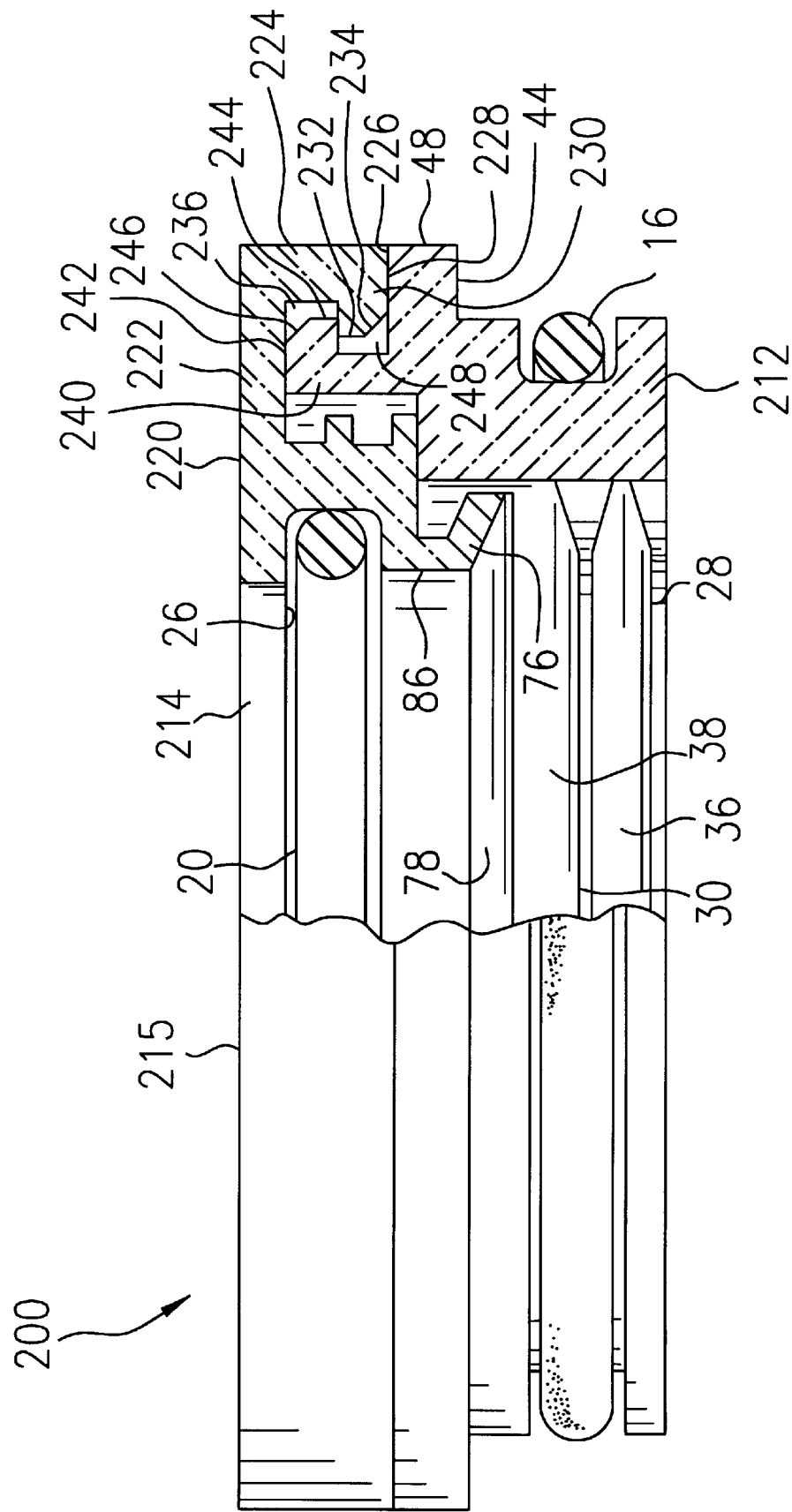
FIG. 8 is a partial cross sectional side view of a seal device constructed in accordance with another embodiment of the present invention.

FIG. 8 illustrates another embodiment of the present invention. Shown therein is a seal device 200 including a rotor 214 and a stator 212. The seal device 200 is useful in applications where the shaft 22 is vertically positioned, such that the rotor 214 would be above the stator 112.

The rotor 214 has an outwardly directed face 220 and includes an intermediate portion 222 and an enclosure member 224. The enclosure member has an inwardly directed face 226. An annular protrusion 230 extends radially inwardly from the enclosure member 224 and includes a radially inwardly directed end face 232 and a slanted surface 234. Between the intermediate portion 222 and the annular protrusion 230 is an annular recess 236.

The stator 212 includes the cover 48, which has an outwardly directed end face 228 facing the inwardly directed face 226 of the enclosure member 224. The stator 212 includes a flange 240, which has an end face 242, a radially outwardly facing end face 244 and a slanted surface 246. A recess 248 is positioned between the end face 244 and the end face 228.

The seal device 200 may be assembled by snap fitting the rotor 214 onto the stator 212. Specifically, the rotor 214 may be placed on the stator 212 such that slanted surfaces 234 and 246 are touching. By exerting a force upon the rotor 214 in the direction of the stator 212, the slanted surface 234 will slide down the slanted surface 246. A certain amount of flex in the intermediate portion 222 and/or the enclosure member will assist in the slanted surface 234 moving relative to the slanted surface 246 and the end face 244. The slanted surface 234 moves to such an extent that the annular protrusion 230 snaps into the recess 248 and the end face 244 is positioned within the recess 236.

Alternatively, the seal device 200 may be assembled by expanding the rotor 214 to increase the diameter of the end face 232. By expanding the end face 232, the rotor 214 can be moved into position with the annular protrusion 230 fitting into the recess 248 and the end face 244 being positioned in the recess 236.

An opening 52, 152 is lacking in the seal device 200. This is due to the vertical positioning of the seal device 200. In operation, oil becomes trapped in annular grooves 36, 38 and eventually drains back into the housing 18. The rotor slinger 76 is useful for diverting oil which splashes against the seal due to bearing or gear movement.

In the illustrated embodiments, particularly satisfactory results are achieved when the diameter of the shaft 22 is approximately one and one-eighth inches, the diameter of the opening of the housing 18 receiving the stator 12 is approximately two inches, and the total axial play $S_t$ of the device 10 is approximately four-thousandths of an inch. But the present invention is not limited to these particular dimensions.

The above description is intended to be illustrative of preferred embodiments which can achieve the objects, features and advantages of the present invention. It is not intended that the present invention be limited thereto. Any modifications coming within the spirit and scope of the following claims are to be considered part of the present invention.

What is claimed as new and desired to be protected by Letters Patent of the United States is:

1. A non-contact labyrinth seal, comprising:

a stator for attachment to a housing such that the shaft and said rotor rotate relative to the housing and said stator, wherein said stator includes a plurality of alternating annular ridges and annular grooves and an axial groove for preventing fluid from exiting the housing; and a rotor for rotating with a shaft, said rotor including a slinger positioned on a housing side of the seal, wherein said slinger has a recess and one of said annular ridges is positioned within said slinger recess.

2. The seal of claim 1, wherein said rotor includes a connecting portion and said stator includes a connecting portion.

3. The seal of claim 2, wherein said rotor connecting portion is an annular recess and said stator connecting portion is an annular protrusion adapted to fit within said annular recess.

4. The seal of claim 3, wherein said annular protrusion is located radially outward of said annular recess.

5. The seal of claim 4, wherein said stator includes an opening for allowing contaminants to exit the seal.

6. The seal of claim 5, wherein said rotor includes alternating ridges and grooves.

7. The seal of claim 6, wherein the seal is a non-contact two piece interlocked labyrinth seal.

8. The seal of claim 6, further comprising a first O-ring for providing a seal between said stator and the housing, and a second O-ring for providing a seal between said rotor and the shaft.

9. The seal of claim 8, wherein one of said annular stator grooves has a greater width than the other of said annular grooves.

10. The seal of claim 1, wherein said stator includes a plurality of alternating annular ridges and annular grooves, said slinger being positioned within one of said annular grooves.

11. The seal of claim 10, wherein said rotor includes an intermediate portion, an enclosure member and a radially inwardly directed annular protrusion and said stator includes a cover and a flange having a radially outwardly directed end face.

12. The seal of claim 11, wherein said rotor includes a recess positioned between said intermediate portion and said radially inwardly directed annular protrusion, said stator includes a recess positioned between said cover and said radially outwardly directed end face, wherein said annular protrusion of said rotor is positioned within said stator recess and said end face of said stator is positioned within said rotor recess.

13. A sealed system, comprising:

a housing having an opening;

a shaft extending through said opening, said shaft being rotatable relative to said housing; and a non-contact labyrinth seal device including:
- a stator sealed to and non-rotatable relative to said housing, said stator including a plurality of alternating annular ridges and annular grooves and an axial groove for preventing fluid from exiting said housing; and
- a rotor having a slinger, said rotor being sealed to and non-rotatable relative to said shaft, said slinger being positioned on the housing side of said seal device, wherein said slinger has a recess and one of said annular ridges is positioned within said slinger recess.

14. The system of claim 13, wherein said rotor includes a connecting portion and said stator includes a connecting portion.

15. The system of claim 14, wherein said rotor connecting portion is an annular recess and said stator connecting portion is an annular protrusion adapted to fit within said annular recess.

16. The system of claim 15, wherein said annular protrusion is located radially outward of said annular recess.

17. The system of claim 16, wherein said stator includes an opening for allowing contaminants to exit the seal.

18. The system of claim 17, wherein said rotor includes alternating ridges and grooves.

19. The system of claim 18, wherein the seal is a non-contact two piece interlocked labyrinth seal.

20. The system of claim 18, further comprising a first O-ring providing a seal between said stator and said housing, and a second O-ring providing a seal between said rotor and said shaft.

21. The system of claim 20, wherein one of said annular stator grooves of said seal device has a greater width than the other of said annular grooves.

22. The system of claim 13, wherein said stator includes a plurality of alternating annular ridges and annular grooves, said slinger being positioned within one of said annular grooves.

23. The system of claim 22, wherein said rotor includes an intermediate portion, an enclosure member and a radially inwardly directed annular protrusion and said stator includes a cover and a flange having a radially outwardly directed end face.

24. The system of claim 23, wherein said rotor includes a recess positioned between said intermediate portion and said radially inwardly directed annular protrusion, said stator includes a recess positioned between said cover and said radially outwardly directed end face, wherein said annular protrusion of said rotor is positioned within said stator recess and said end face of said stator is positioned within said rotor recess.

* * * * *